United States Patent [19]

Visser et al.

[11]  4,207,349

[45]  Jun. 10, 1980

[54] PROTEIN FIBRES

[75] Inventors: Johannes Visser, Maassluis; Gijsbert W. P. Bams, Rotterdam, both of Netherlands

[73] Assignee: Thomas J. Lipton, Inc., Englewood Cliffs, N.J.

[21] Appl. No.: 878,763

[22] Filed: Feb. 17, 1978

[30] Foreign Application Priority Data

Feb. 21, 1977 [GB] United Kingdom ............... 7204/77

[51] Int. Cl.$^2$ .............................................. A23J 3/00
[52] U.S. Cl. ..................................... 426/271; 426/588; 426/657; 426/456; 426/491; 426/516; 426/802
[58] Field of Search ............... 426/271, 580, 587, 588, 426/657, 491, 456, 516, 802

[56] References Cited

U.S. PATENT DOCUMENTS

| 2,813,794 | 11/1957 | Anson et al. ................ 426/802 X |
|---|---|---|
| 2,952,543 | 9/1960 | Szczesniak et al. ............ 426/802 X |
| 3,674,500 | 7/1972 | Nagasawa et al. ............. 426/802 X |
| 3,800,053 | 3/1974 | Lange ............................ 426/802 X |
| 3,963,837 | 6/1976 | Maubois et al. ................ 426/491 X |
| 3,979,526 | 9/1976 | Suzuki et al. .................. 426/491 X |

FOREIGN PATENT DOCUMENTS

| 520615 | 1/1956 | Canada ............................... 426/271 |
|---|---|---|
| 1474179 | 5/1977 | United Kingdom . | |

OTHER PUBLICATIONS

Lewis, M. A. et al. "Stable Foams from Food Proteins with Polyphosphates", Food Technology, Jul. 1953 pp. 261-263.

Primary Examiner—Robert A. Yoncoskie
Attorney, Agent, or Firm—Brumbaugh, Graves, Donohue & Raymond

[57] ABSTRACT

A process for producing edible protein fibres by dry-spinning an aqueous mixture based on milk solids in which the ratio of calcium ions to the casein present is reduced to a value below 0.85 mM $Ca^{2+}$/g. casein.

The fibres obtained according to this process can be used as a fibrous component in reformed meat formulations or as an ingredient for protein-enriched snacks.

13 Claims, No Drawings

PROTEIN FIBRES

The present invention relates to a dry-spinnable composition based on milk solids and to a process for preparing such composition.

The present invention relates also to a dry-spinning process for producing edible fibres starting from said composition, to the edible fibres obtained according to this process, and their application as a fibrous component in reformed meat formulations or as a protein ingredient in protein-enriched snacks, breakfast cereals and the like.

It is known to produce a dry-spinnable composition based on casein and to convert said composition into fibres by dry-spinning as described in Belgian patent specification No. 819,432.

Attempts have been made to substitute milk solids, i.e. ordinary milk powder or skim milk powder, for the casein powder used so far in the spinning dope. These attempts failed since no suitable spinning dope could be obtained. It is believed that the continuous network of casein molecules, which is required for obtaining a homogeneous, continuous phase, is absent and that individual networks in the form of casein micelles are present, which are not capable of fusing with each other due to the stabilizing effect of kappa-casein.

We have found a method for modifying the composition of milk solids in such a way that aqueous mixtures of the modified milk solids containing compositions become dry-spinnable.

The invention is based on the observation that the factor responsible for the formation of a continuous network of casein molecules is a critical ratio expressed in mMol calcium ions per gram of casein present in the composition. In unmodified milk solids, i.e. milk powder or skim milk powder, the $[Ca^{2+}]/g$ casein varies slightly from batch to batch and may range from 1.05 to 1.20 mM calcium ions per g. of casein. In milk solids modified according to the invention this ratio is reduced to a value below 0.85 mM $Ca^{2+}$/g. casein, which will be designated throughout the specification as the critical ratio.

Skim milk powder contains about 4% moisture, 0.5% fat, 50.4% lactose, 36.1% protein (6.1% wheyprotein and 30% casein), 9% salts (1.3% Ca).

Milk powder contains 3% moisture, 24.5% fat, 37.8% lactose, 27.2% protein (5.4% wheyprotein, 21.8% casein) and 7.5% salts (1% Ca).

In the aqueous mixture of milk solids any ratio below the critical ratio will ensure that the mixture is dry-spinnable.

We have found several methods for reducing the original ratio present in milk solids, to a value below 0.85 mM $Ca^{2+}$/g. casein. One of the methods consists in adding to an aqueous mixture based on milk solids, a compound which binds calcium ions, thereby destabilizing the individual network of casein micelles and promoting the formation of a continuous phase.

The calcium binding agent can be selected from the wide group of well-known calcium binders or calcium complexing agents such as ethylene diamine tetraacetic acid or an edible salt thereof, an alkali metal salt of pyrophosphate or -tripolyphosphate, sodium hydroxide which converts calcium ions in insoluble calcium hydroxide, or sodium caseinate.

It will be understood that calcium binders which are permitted for use in foods such as sodium hydroxide or the above phosphate salts are preferably used.

The proportion of calcium binder which should be added to reach a value below the critical ratio depends on the nature of the calcium binder and will easily be established in every particular case. The $[Ca^{2+}]/g$. casein-ratio can be assessed applying classical or instrumental analytical methods such as e.g. atomic absorption.

Another suitable method for reducing the original ratio to a value below the critical ratio consists in subjecting an aqueous mixture of milk solids to membrane filtration. By selecting suitable membranes calcium ions and lactose can be removed selectively whereas the protein molecules present in milk will be retained. Suitable membranes are e.g. cellulose acetate membranes having a cut-off limit of less than 10,000 daltons.

We have found it very suitable to conduct ultrafiltration for a period long enough to achieve a reduction of the lactose concentration to a level ranging from 0 to 50 wt.%, based on the dry weight of the composition and preferably to a level between 0 and 25 wt%. Lactose seems to be a component affecting the spinnability of the spinning dope and the properties of the fibres. A low level of lactose in the spinning dope is advantageous for obtaining fibres which do not display sandiness.

In the case where lactose is present at a level below about 25 wt.% it is sufficient to reduce the original $Ca^{2+}$/casein ratio to a value of about 0.7–0.8 mM $Ca^{2+}$/casein in order to obtain a useful spinning dope.

In the case where lactose is present at a level from 25 wt.%–50 wt.% it is preferable to reduce the original $Ca^{2+}$/casein ratio further down to a value between 0.8 mM calcium ions/g. and 0.1 mM calcium ions/g. in order to obtain a useful spinning dope.

At the maximum level of lactose, which is 50 wt.%, based on the dry weight of the milk solids, in unmodified milk solids, it is preferable to reduce the original $Ca^{2+}$/casein ratio down to 0.1 mM $Ca^{2+}$/g. casein or even lower.

One should however bear in mind that fibres obtained starting from spinning dopes having ratios below 0.1 mM $Ca^{2+}$/g. casein, are not stable in an aqueous medium, especially when the medium contains sodium chloride. Put in other words, one would get a spinning dope which is perfectly spinnable but fibres which have a more limited application than those obtained from a spinning dope having a ratio above 0.1 mM $Ca^{2+}$/g. casein.

Another important parameter is the pH of the spinning dope. This should range from 5.0 to 6.6, preferably from 5.5 to 6.5, and ideally from 5.6 to 5.9.

A pH higher than 6.6 will result in fibres which are not stable in aqueous media and which have undesirable organoleptic properties.

For obtaining a useful spinning composition the proportion of casein to water should range from 0.3 to 0.7 w/w.

At high levels of lactose, which means values ranging from 25–50 wt.% based on the milk solids, the preferred ratio of casein to water ranges from 0.3 to 0.5. At lower levels of lactose which means values below 25 wt.%, the preferred ratio of casein to water ranges from 0.4 to 0.7 w/w.

The process for preparing a dry-spinnable dope involves preparing an aqueous mixture of milk solids to obtain a casein to water ratio within the ranges recommended above.

The aqueous mixture is prepared by mixing the ingredients at a temperature preferably ranging from room temperature to 90° C. and ideally between 50 ° and 70° C.

The [$Ca^{2+}$]/casein-ratio is subsequently reduced according to the invention to a value below the critical ratio of 0.85 mM $Ca^{2+}$/g. casein e.g. by adding a calcium binder or by applying ultra-filtration as described elsewhere in the specification.

The pH of the mixture is adjusted when necessary to a value within the ranges recommended elsewhere in the specification, by adding an edible acid such as hydrochloric acid or base e.g. an alkali metal hydroxide such as sodium hydroxide to obtain the final spinning dope.

It will be understood that additives such as fat, spedific flavours, and colorants can be added to the final spinning dope to obtain the desired organoleptic properties.

Edible fibres are produced by dry-spinning a spinning dope according to the invention.

By dry-spinning we mean extruding a spinning dope into a gaseous medium as distinct from extruding a spinning dope into a liquid coagulating bath.

The process according to the invention for producing edible fibres involves:
 (a) preparing a dry-spinnable composition according to the invention as described elsewhere in the specification,
 (b) extruding the dry-spinnable composition into a gaseous medium at a temperature ranging from room temperature up to 90° C., and
 (c) drying the fibres obtained to a moisture content ranging from 0 to 20%.

The dry-spinnable composition according to the invention is extruded through a spinneret with orifices having a diameter which varies preferably from 0.05 to 2.00 mm.

Extrusion is preferably carried out at a temperature ranging from 50° to 70° C. to avoid browning of the fibres.

In the case where a secondary source of protein e.g. soy protein, is present which gels or sets on heating it is advisable to carry out extrusion at a temperature below the point at which the protein starts gelling.

The gaseous medium can be air, nitrogen or steam. For practical and economical reasons air is preferred.

The fibres obtained are dried using conventional means such as air-drying or micro-wave drying, up to a moisture content preferably ranging from 0 to 11%, at a drying temperature preferably varying from 90° to 130° C. to achieve efficient and relatively quick drying.

Before incorporation in food products such as e.g. reformed meat formulations, simulated chicken formulations, the fibres have to be rehydrated.

Rehydration is usually carried out in warm water, preferably at a temperature between 90° and 120° C., optionally in the presence of calcium ions e.g. in a 3-10% solution of calcium chloride, to impart the fibres an extra stabilisation to sodium chloride containing media.

The invention will be illustrated in the follwing Examples.

EXAMPLE 1

Preparation of Fibres Based on Milk Solids 400 g. skimmilk powder were mixed with 400 g. water at a temperature of 65° C. 12 g. of sodium pyrophosphate was added to the mixture to reduce the original $Ca^{2+}$/casein ratio as defined in the specification from 1.1 mM $Ca^{2+}$ per gram of casein to 0.7 mM $Ca^{2+}$ per gram of casein. The pH of the mixture was 5.9. The spinnable mixture was extruded at 65° C. into air through spinneret orifices of 0.5 mm diameter.

The fibres obtained were air dried at a temperature of 120° C. to a moisture content of 6%.

EXAMPLE 2

A spinnable mixture was prepared by mixing 200 g. skimmilk powder with 150 g. water at 60° C. To this mixture was added 24 g. sodium caseinate to reduce the original $Ca^{2+}$/casein ratio from 1.1 mM $Ca^{2+}$/gram casein to 0.7 mM $Ca^{2+}$/gram casein.

The pH of the mixture was 5.8. This mixture was spun at 60° C. and the fibres were dried, following the conditions of Example 1.

EXAMPLE 3

A spinnable mixture was prepared by mixing 100 g. skimmilk powder with 70 g. water at 60° C. To this mixture 5 g. ethylene diaminotetraacetate (sodium salt of EDTA) were added and the pH was raised to 5.9.

The addition of EDTA lowered the original ratio from 1.1 mM Ca/g. casein to 0.7 mM/g. casein. The mixture was spun and the fibres were dried, following the general procedure of Example 1.

EXAMPLE 4

200 g. skim milk powder were mixed with 150 g. water at 65° C. To this mixture were added 3.2 ml of a 8 M solution of sodium hydroxide, achieving a reduction of the ratio from 1.1 mM $Ca^{2+}$/g. casein to 0.7 mM $Ca^{2+}$/g. casein.

The pH of the mixture was 6.4. The spinnable mixture obtained was spun into fibres and the fibres were dried, following the general procedure of Example 1.

EXAMPLE 5

An aqueous mixture of skim milk powder was subjected to ultrafiltration on a cellulose acetate membrane having a cut-off limit of less than 10,000 daltons, for a period long enough to achieve a reduction of the ratio from 1.1 mM $Ca^{2+}$/g. casein to 0.8 mM $Ca^{2+}$/g. casein and a reduction of the lactose level from 50 wt.%, based on the dry weight of the skim milk powder, to 25 wt.%

100 g. of skim milk powder solids obtained by drying the ultrafiltration retentate were mixed at 65° C. with 150 g. water, to obtain a homogeneous spinnable mixture of pH 6.0.

The spinnable composition obtained was spun into fibres and the fibres were dried following the procedure of Example 1.

EXAMPLE 6

80 g. skim milk powder were mixed with 250 g. water at 65° C. To this mixture were added 80 g. sodium caseinate to achieve a reduction of the $Ca^{2+}$/g. casein from 1.1 mM $Ca^{2+}$/g to 0.3 mM $Ca^{2+}$/g. casein.

40 g. soy protein isolate were added to the mixture and the total mixture was homogenized. The pH of the final mixture was 6.1.

The spinnable composition was spun into fibres and the fibres obtained were dried, according to the general procedure of Example 1.

EXAMPLE 1A–6A

The general procedure of Examples 1 to 6 was repeated using instead of skim milk powder ordinary milk powder, and adjusting the proportions of the reagents, to obtain spinnable compositions and fibres similar to those of Examples 1 to 6.

EXAMPLE 7

Application of Fibres in Food Products 50 g. of the dry fibres obtained according to Example 6 were rehydrated in excess boiling tap water during 10 minutes, followed by rinsing and cooling with cold tap water and subsequently removal of the extraneous water to a final weight of about 150 gram. 150 g. of the rehydrated fibres were mixed with 50 g. chicken meat and 100 g. of a binder composition containing egg albumin (6 g.), fat (10 g.), flavours (3 g.), and further water up to 100 g.

The total formulation was heat-set in a mould in the shape of chicken fingers (approximately 8×2.5×1 cm). Each finger was battered with bread crumbs and pre-fried.

The chicken fingers after frying in oil at 140°–180° C. could not be distinguished from the all meat control due to the excellent colour (white) and tenderness of the fibres and the absence of any off-flavour.

EXAMPLE 8

The procedure of Example 1 for producing a spinnable mixture was repeated while including a cheese flavour in the formulation. The mixture was spun into fibres according to Example 1 and the fibres obtained were compacted and shaped to obtain a snack of the desired form. The product obtained was dried to a moisture content of 3% and was stable for several months at ambient temperature.

EXAMPLE 9

The procedure of Example 8 was repeated but using a raspberry flavour instead of the cheese flavour.

We claim:

1. A process for producing edible fibers which comprises:
    (a) providing fat containing milk powder or skim milk power
    (b) adding water to the powder to obtain an aqueous mixture having a ratio by weight of casein to water in the range of 0.3 to 0.7 w/w,
    (c) reducing the ratio of calcium ions to casein in the mixture to a value below 0.85 mM calcium per gram of casein,
    (d) adjusting the pH of the aqueous mixture to a pH of from 5.0 to 6.6,
    (e) extruding the mixture from step (d) into a gaseous medium at a temperature ranging from room temperature up to 90° C., to obtain fibres, and
    (f) drying the fibres to a moisture content not exceeding 20%.

2. A process according to claim 1, in which the calcium ions to casein ratio is 0.1 to 0.8.

3. A process according to claim 1 in which the ratio of calcium ions to casein is reduced by adding an effective amount of calcium binding agent.

4. A process according to claim 3 in which the calcium binding agent is selected from the group consisting of an alkali metal pyrophosphate, an alkali metal tripolyphosphate, an alkali metal hydroxide, ethylenediamine tetraacetic acid or an edible salt thereof and sodium caseinate.

5. A process according to claim 1, in which the ratio of calcium ions to casein in the milk solids is reduced by ultrafiltration.

6. A process according to claim 5, in which the ultrafiltration is conducted using a membrane which is permeable to calcium ions and lactose but which retains protein.

7. A process according to claim 6, in which the membrane is of cellulose acetate with a cut off limit of less than 10,000 daltons.

8. A process according to claim 6, in which ultrafiltration is conducted for a period long enough to achieve a reduction of the level of lactose to less than 50 wt.% based on the dry weight of the milk solids.

9. A process according to claim 6, in which ultrafiltration is conducted for a period long enough to achieve a reduction of the level of lactose to a value ranging from 0–25 wt.% based on the dry weight of milk solids.

10. A process according to claim 1, in which the pH of the mixture is adjusted to a pH of from 5.6 to 6.5.

11. A process according to claim 1, in which the gaseous medium in step (e) is air.

12. A process according to claim 1, in which step (e) is carried out at 50° to 70° C.

13. A process according to claim 1, in which the fibres are dried to a moisture content not exceeding 11%.

* * * * *